Nov. 8, 1966 — T. STUTZ — 3,283,429

VARIABLE DISPLAY BOARD

Filed May 18, 1964 — 7 Sheets-Sheet 1

Inventor
Theo Stutz

Nov. 8, 1966 T. STUTZ 3,283,429

VARIABLE DISPLAY BOARD

Filed May 18, 1964 7 Sheets-Sheet 6

FIG.8

Inventor
Theo Stutz

Nov. 8, 1966 T. STUTZ 3,283,429
VARIABLE DISPLAY BOARD

Filed May 18, 1964 7 Sheets-Sheet 7

Inventor
Theo Stutz 3,283,429
VARIABLE DISPLAY BOARD
Theo Stutz, Zollikerberg, Switzerland, assignor to
Contraves AG, Zurich, Switzerland
Filed May 18, 1964, Ser. No. 368,180
Claims priority, application Switzerland, May 16, 1963,
6,159/63
14 Claims. (Cl. 40—65)

The present invention concerns a variable display board for selectively displaying different units of information, particularly an arrangement of this kind wherein a plurality of units of information can be stored and which makes it possible to select arbitrarily at any time any one of these units of information for being displayed. Arrangements of this type can be used advantageously for many purposes e.g. for paging persons in buildings or establishments, for indicating existing operative conditions of installations and machines, or for indicating digital data furnished by measuring and computing machines. Another field of useful application of arrangements of this kind is the field of advertising. It should be understood, therefore, that the term "unit of information" is to be interpreted broadly as including any type of character (number or letter) symbol of any kind including a pictorial representation.

Variable display devices of various kinds are well known. However, it is one object of this invention to provide for a variable display board which operates in such a manner that the change from the display of one particular unit of information to the display of another unit of information is carried out as rapidly as possible.

It is another object of this invention to provide for a device as mentioned above which, in spite of the requirement of said rapid change between displayed units of information, can be constructed so as to display comparatively large size units of information. This latter demand cannot be satisfied with known display devices comprising electronically operated number indicating lamps.

There are known mechanically adjustable display devices which are constructed so as to display comparatively large size units of information, but a comparatively fast change from one display to another display is possible only in one direction of change while, if a change in the opposite direction is desired, a considerable sequence of changes between all of the stored units of information must be produced. Thus it is another object of this invention to provide for an arrangement as set forth which is capable of carrying out changes between stored units of information in one direction of change as rapidly as in the opposite direction, and which, in addition, makes it possible to change from one stored unit of information to any other one of the stored units of information directly and without having to run through a series of changes involving all the other units of information stored sequentially between the first displayed one and the desired other stored unit of information.

With above objects in view the invention includes a variable display board for selectively displaying different units of information, comprising, in combination, frame means having a principal plane and a front side and a rear side relative thereto; information storing means movably mounted in said frame and including for each unit of information to be stored a series of a predetermined number of elongated display plate elements extending parallel with each other and substantially parallel with said plane and partly overlapping one another, respectively, in transverse direction, the forwardly facing exposed parallel surface portions of said series of plate elements being adapted to carry respectively consecutive parallel strip elements of such unit of information so that the composite entire forwardly facing exposed surface area of said series of plate elements carries a complete unit of information, a plurality of such series of plate elements being arranged in said frame relative to each other in such a manner that of all said series of plate elements, those elements which have the same sequential order position within the respective series are in normal position superimposed over each other so as to form a stack whereby only said forwardly exposed surface portions of the foremost series of plate elements in said stack and a unit of information carried thereon is visible, said different series of plate elements being shiftable from said normal position thereof to a transversely displaced position in which only the forwardly exposed surface portions of one selected one of said series of plate elements and a unit of information carried thereon is visible; and actuating means in said frame for shifting at least one selected one of said series of plate elements from said normal position thereof to said transversely displaced position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
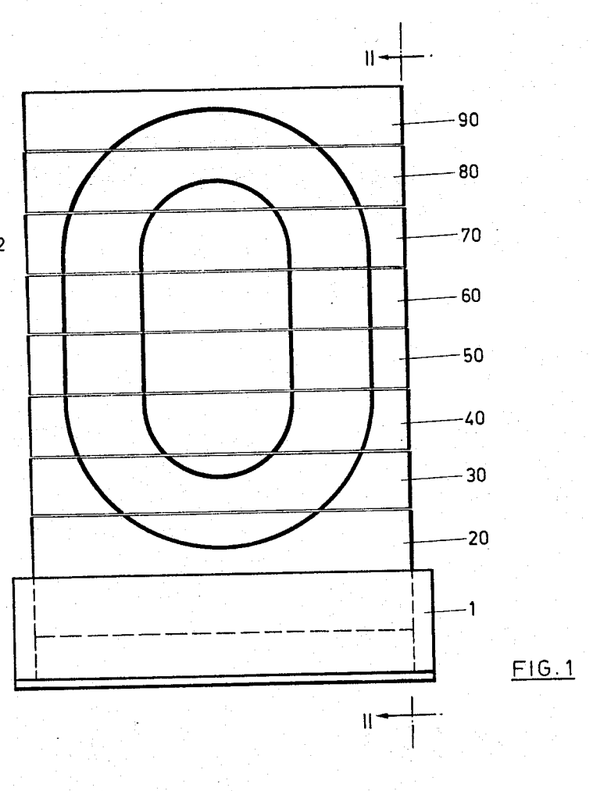
FIG. 1 is a diagrammatic elevation of a variable display board according to the invention in one operative position which may be its normal position.
Figure 2:
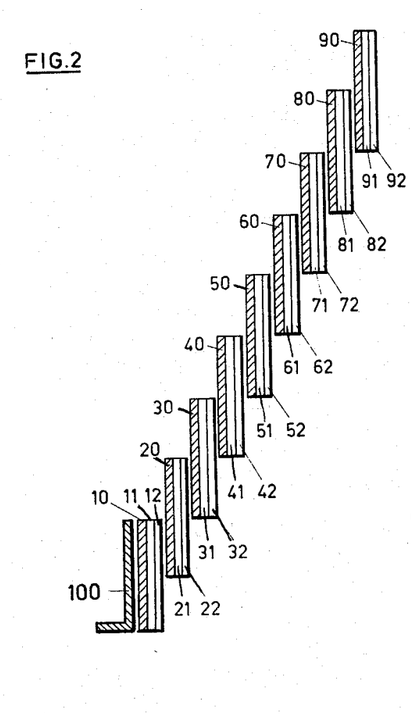
FIG. 2 is a diagrammatic side view of the arrangement according to FIG. 1, partly in section along line II—II of FIG. 1.
Figure 3:
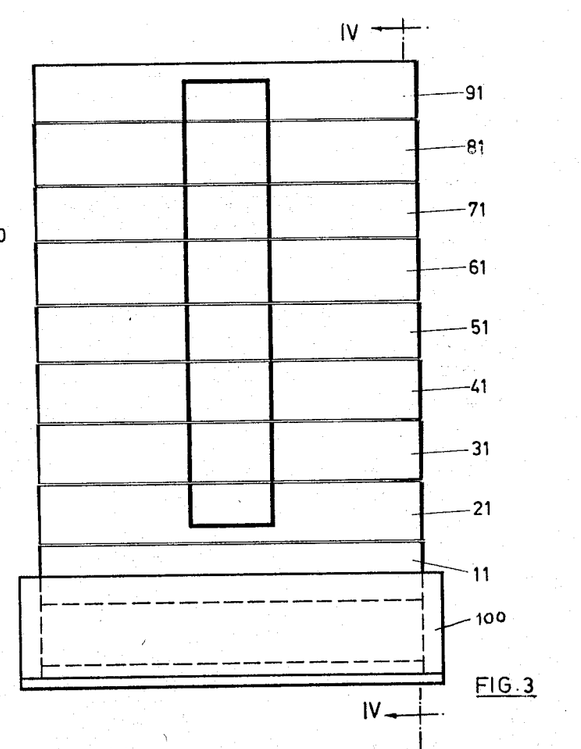
FIG. 3 is an elevation of the arrangement according to FIG. 1 except that the elements of the arrangement are in a different position.
Figure 4:
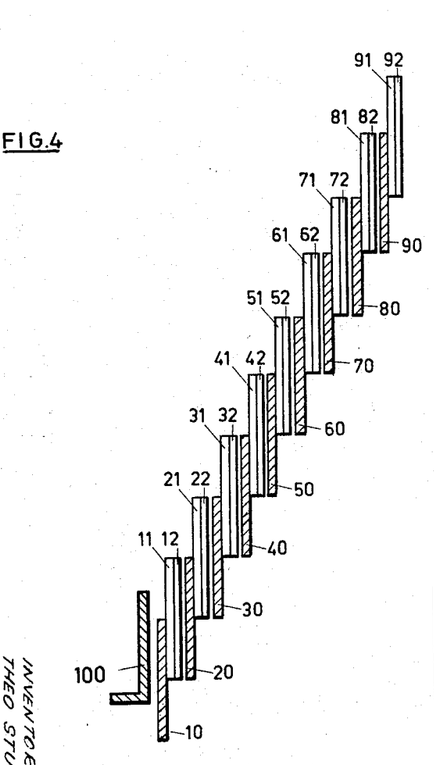
FIG. 4 is a side view similar to FIG. 2 except that it shows the position of the elements in accordance with FIG. 3.

FIGS. 1–4 are designed to illustrate only the basic principle of the invention. Assuming that the display board according to the invention is designed for selectively displaying individual numbers, FIGS. 1 and 2 illustrate the condition of the display board when it is set for displaying the number "0," while FIGS. 3 and 4 illustrate the same display board when it is set for displaying the number "1."

As can be seen from FIG. 1 a unit of information "0" is subdivided into a plurality of parallel strip elements which are respectively distributed over the forwardly exposed surface portions of a corresponding number of elongated plate elements 10 . . . 90 which extend parallel with each other along a reference plane which in this illustration is the plane of the drawing. As can be seen from FIG. 2 the composite entire visible surface area of the plate elements 10 . . . 90 is composed of the forwardly exposed surface portions of these plate elements 10 . . . 90 which partly overlap each other. Each of the elements 10 . . . 90 is the foremost one of a stack of elements of similar size and arrangement 11 . . . 91 and 12 . . . 92, respectively, which belong to a second and third series of such overlapping plate elements all arranged behind the first series comprising the plate elements 10 . . . 90. The position of these plate elements of the different series thereof as illustrated in FIG. 1 may be considered the normal position of these series relative to each other. It should be understood that the elements of the first series 10 . . . 90 has been shown hatched only in order to emphasize the fact that these elements 10 . . . 90 belong together to one series thereof. This hatching does not mean that they are sectioned because FIG. 1 is a side view or end view of the arrangement. The thickness of the individual plate elements 10 . . . 92 has been greatly exaggerated because under normal circumstances these plates will be made of very thin sheet material and also normally the number of series of plate elements will be much larger, only three of these series of plate elements being shown by way of example in FIGS. 1 and 2.

In order to change from the display of one unit of information e.g. "0" to another unit of information e.g. "1" the foremost series of plate elements 10 . . . 90 i.e. the foremost plate element of each of the ten stacks thereof, would have to be shifted from the illustrated position into a transversely displaced position a certain step in downward direction while at least the plate elements of the next following series of plate elements 11 . . . 91, preferably all the plate elements of all the series threof located behind the first mentioned series, have to be shifted in upward direction transversely thereof a certain step, as will be explained in greater detail in reference to FIGS. 5–10. The step of the shift preferably amounts only to about one quarter of the actual width of each individual plate element. In the present example in this manner a displaced position as illustrated by FIGS. 3 and 4 will be reached. As can be seen, in this relative position of the various series of plate elements relative to each other now the forwardly exposed surface portions only of the plate elements 11 . . . 91 of the second series thereof and consequently in this manner the unit of information "1" carried on the surface portions are visible.

A stationary cover plate 100 is shown in FIGS. 1–4 in section and will be useful for observing the shift of position of the plate elements relative to each other and relative to this cover plate 100 which may be considered as a part of a frame carrying the entire set of movable elements of the display board.

Assuming that the next following unit of information "2" is to be displayed, then one would have to shift the plate elements of the first and second series thereof namely the series 10 . . . 90 and the series 11 . . . 91 in downward direction while shifting the third set comprising the plate elements 12 . . . 92 in upward direction a distance amounting also to about one quarter of the width of the strips so that in this manner now the unit of information "2" would be displayed under the assumption that this unit of information was painted or otherwise applied to the forwardly exposed surface portions of the plate elements of the third set or series thereof.

Figure 5:
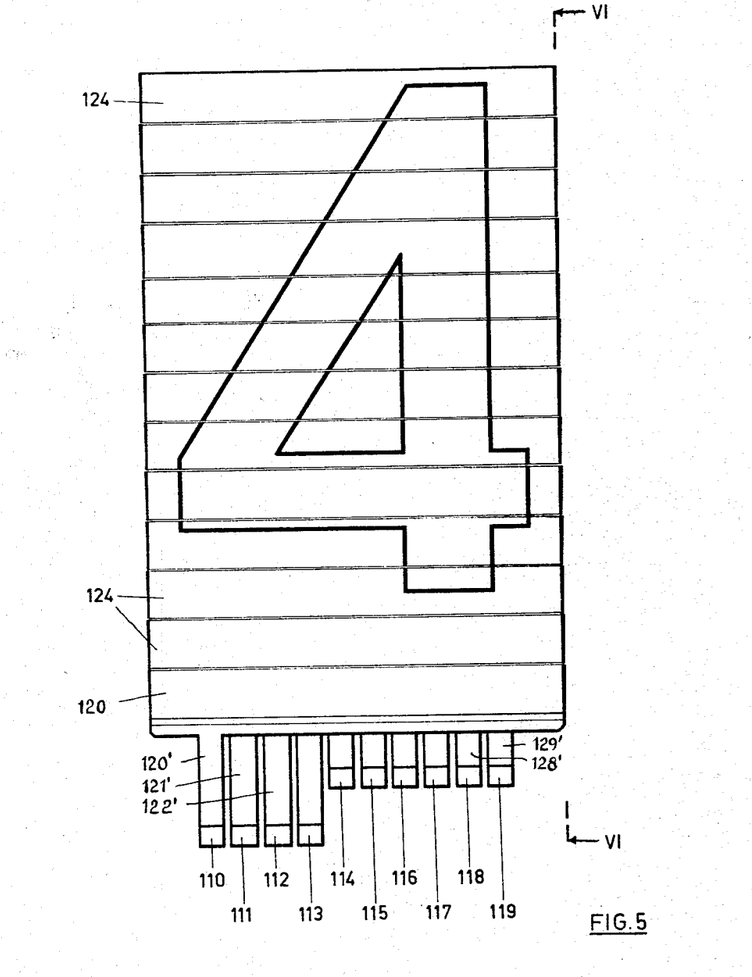
FIG. 5 is an elevation or front view of a more elaborate embodiment of the invention.
Figure 6:
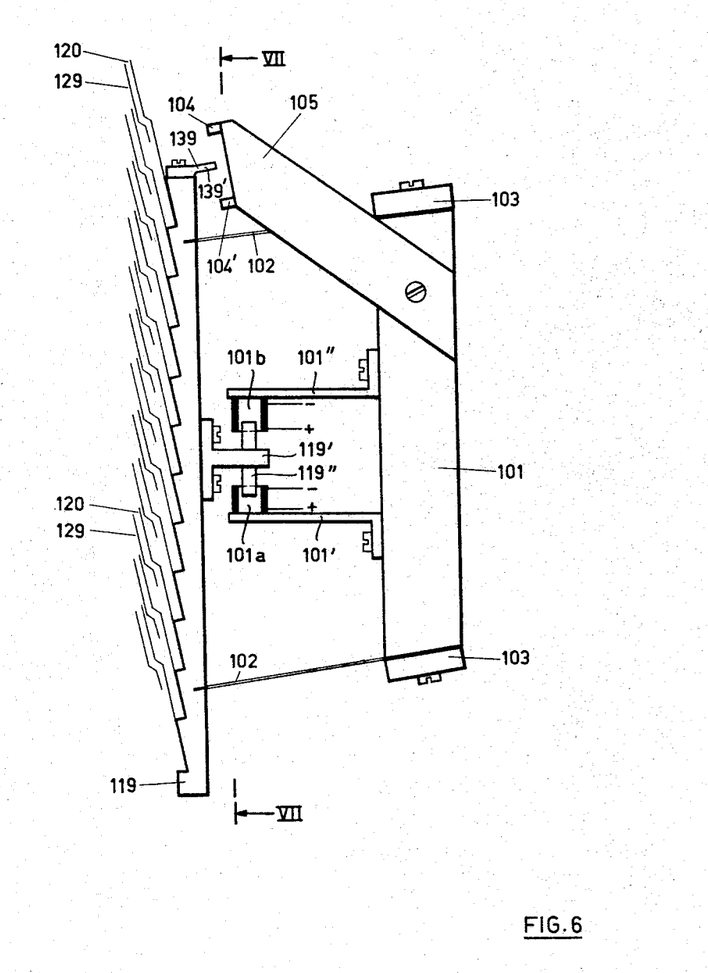
FIG. 6 is a side view of the arrangement according to FIG. 5, the view being taken in the direction of the arrows VI in FIG. 5.
Figure 7:
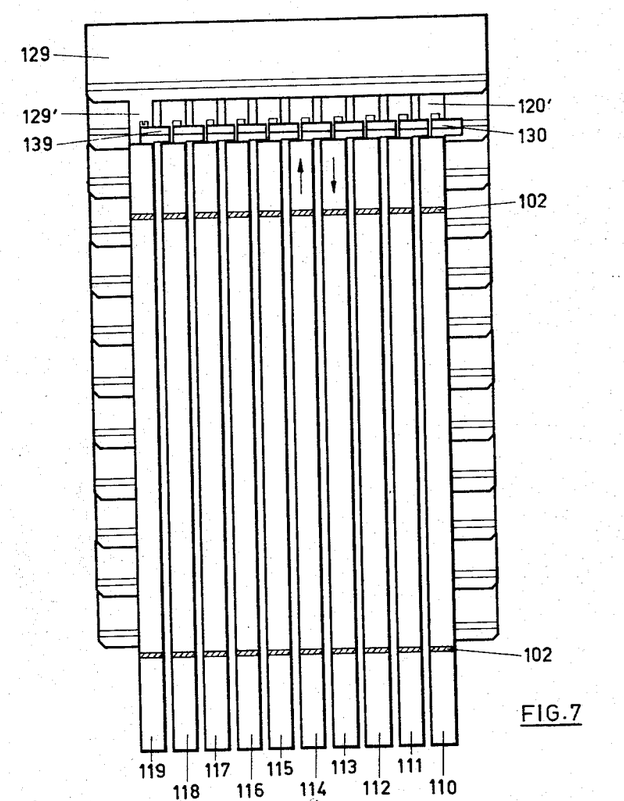
FIG. 7 is a rear view of the arrangement according to FIGS. 5 and 6, partly in section along line VII—VII of FIG. 6.
Figure 7A:
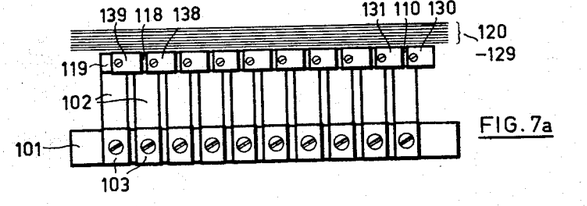
FIG. 7a is a plan view of the arrangement according to FIGS. 5–7, some elements thereof being omitted for the sake of clarity of the illustration.
Figure 8:
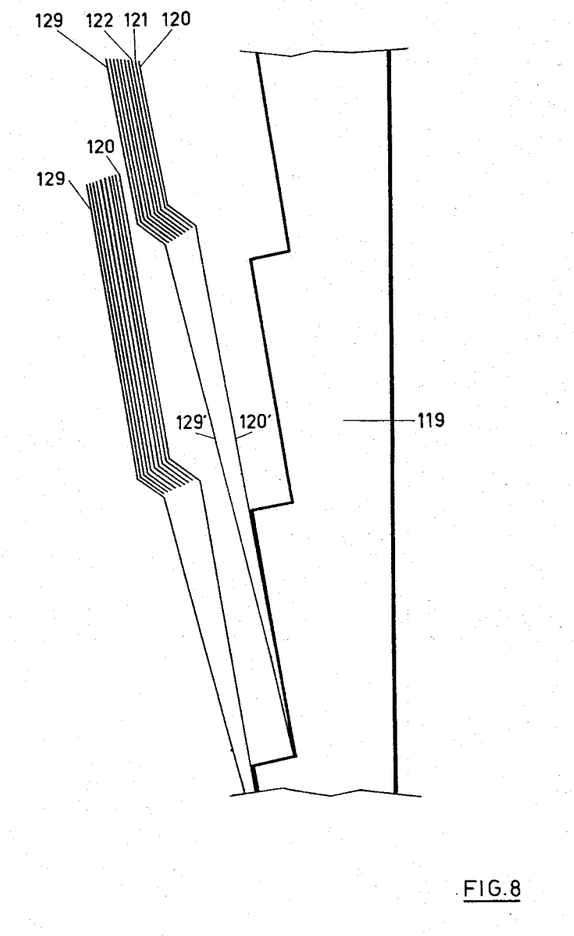
FIG. 8 is a diagrammatic illustration of a portion of FIG. 6 at a considerably larger scale.
Figure 9:
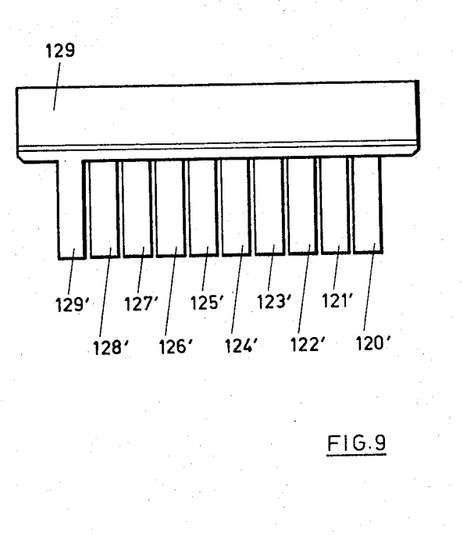
FIG. 9 is a rear view of a portion of the arrangement according to FIGS. 5–7.
Figure 10:
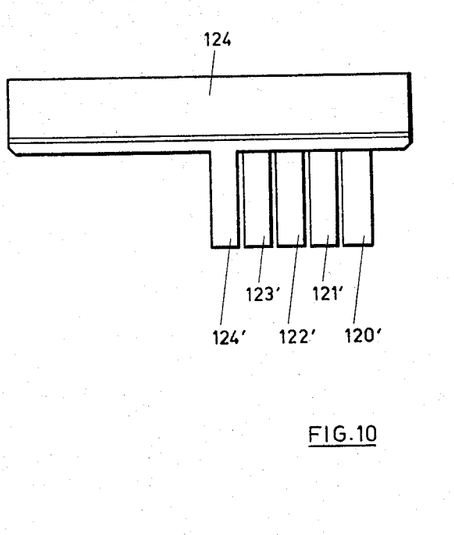
FIG. 10 is a similar rear view of the arrangement of FIG. 9 except that a number of elements thereof is omitted.

Referring now to FIGS. 5–10 and particularly to FIG. 6 the operative elements of an embodiment of the invention will be described in greater detail. This embodiment is particularly well suited for displaying numbers of the decimal system. The arrangement comprises a stationary main frame 101 extending along a principal plane which ordinarily will be a vertical plane and having a front side and a rear side relative to that general plane. Along the upper edge and likewise along the lower edge of the frame 101 ten blade springs 102 are attached by means of clamping pieces 103, the springs 102 extending parallel with each other from the frame 101 in forward direction as can be seen particularly from FIGS. 6 and 7a. As can be seen further there are therefore ten pairs of blade springs 102, the two springs of each pair being located one above the other. Each pair of blade springs 102 is attached at the forward end thereof to a plate carrier so that ten such carriers marked 110–119 extend parallel with each other along a plane substantially parallel with the principal plane of the frame 101. Each of the plate carriers 110–119 is formed along its front face with twelve saw-tooth shaped notches. Each of these plate carriers 110–119 is assigned to a different series of plate elements, and more specifically in the present example to a different one of the digits "0–9" of the decimal number system which are to be selectively displayed. Correspondingly, the arrangement comprises ten series of plate elements, each series comprising twelve plate elements. For the sake of simplicity all the plate elements of the first series thereof are designated by 120, all plate elements of the second series are designated 121 and so on up to the last series of plate elements which are all designated by 129. Each of the plate elements 120–129 is provided at its lower end with an extension 120'–129', respectively, as can be seen particularly from FIGS. 8–10. For obvious reasons, these extension are not attached to the respectively pertaining plate elements in the same manner e.g. in every case near the center of the plate elements. As a matter of fact, FIG. 9 shows very clearly that the individual extensions 120'–129' are laterally offset against each other in such a manner that the individual extensions of the different series of plate elements are in alignment with the respectively corresponding plate carrier 110–119 which is assigned to the respectively corresponding series of plate elements. For instance, the extensions 129' of all the plate elements 129 are in alignment with the plate carrier bar 119, the extensions 128' of the second series of plate elements are in alignment with the plate carrier 118 etc. Consequently, the extensions 129' of the plate elements 129 of the first series thereof are respectively attached by suitable means of known kind to the saw-tooth notches of the plate carrier bar 119, the extensions 128' are mounted in the notches of the plate carrier bar 118 and so on, finally the extensions 120' of the last series of plate elements 120 are attached to the notches of the plate carrier bar 110. In FIGS. 6 and 8 these connections are illustrated rather diagrammatically because space would not permit to show these connections in full detail.

It should be noted that FIGS. 6, 7 and 7a show that at the upper end of each of the plate carrier bars 110–119 entraining means are mounted namely plates 130–139, respectively which project laterally over the upper end of the respectively neighboring plate carrier bar. Therefore, looking at FIG. 7, it will be understood that a downward movement of the plate carrier bar 119 would cause the plate 139 to take the neighboring plate carrier bar 118 along which movement would cause in a similar manner not only the neighboring bar 117 but also all the remaining bars up to the plate carrier bar 110 to follow this downward movement. On the other hand, if for instance the plate carrier bar 117 would be shifted in upward direction the upper end of this bar 117 would take the plate 138 along an upward direction so that also the bar 118 would move in this direction and this in turn would also cause the bar 119 to move in the same manner.

Assuming now that for instance the unit of information "4" is to be displayed by selecting this particular unit from the total number of stored units of information, then the plate carrier member 113 would have to be shifted in downward direction and the neighboring plate element carrier 114 would have to be moved in upward direction as indicated by arrows in FIG. 7. As a consequence, together with the bar 113 also the bars 112, 111 and 110 would be moved in downward direction, while together with the bar 114 also the other bars 115-119 would be moved in upward direction. After this shift the condition would exist which is illustrated by FIG. 5. The series of plate elements 120-123 would all be in downward shifted position and superimposed one over the other while the series of plate elements 124 together with the remaining series of plate elements hidden behind the series 124 would be in the upwardly shifted position so that the exposed forwardly facing surface portions carrying the unit of information "4" would be visible as shown in FIG. 5. In an analogous manner any other one of the stored units of information and carried by the forwardly facing surface portions of the individual series of plate elements could be selected and caused to be displayed simply by shifting a selected group of series of plate elements, or at least one such series, in downward direction and shifting simultaneously another series or the remainder of the series of plate elements in opposite upward direction.

The shifting of the individual plate carrier bars and of the respective sets of plate elements can be effected in various ways. For instance mechanical means may be used. However, preferably electric means should be provided because in this manner the desired high speed operation can be accomplished more easily and more reliably. By way of example FIG. 6 illustrates diagrammatically electromagnetic shifting means. In accordance with the illustration each of the plate carrier bars 110-119 may be provided with a bracket e.g. the bracket 119' attached to the rear face of the respective plate carrier bar e.g. 119. The bracket 119', being typical of all these brackets and actuating devices, carries a stationary armature 119" made of magnetic material. Electromagnets 101a and 101b carried by corresponding brackets 101' and 101", respectively mounted on the frame 101 are so arranged that when the respective bar 119 due to the action of the springs 102 is in normal position the armature 119" does not project, or projects only a small amount, into the interior of the electromagnets 101a and 101b. The electromagnets are connected to electrical control circuits, not shown, in such a manner and are so wound that upon energization of the electromagnet 101a the armature 119" is attracted and the bar 119 is shifted downwards, while upon energization of the electromagnet 101b the armature 119" is attracted in upward direction and consequently the bar 119 shifted upwards. Evidently it does not require invention or a detailed description of the electrical control circuitry because it is very easy to arrange the connections to the various pairs of electromagnets in such a manner that when, referring to the above example, the number "n" as a unit of information is to be displayed the electromagnet associated with the nth plate carrier bar in the series thereof 110-119 is energized so as to move this particular bar in upward direction, while simultaneously the electromagnet associated with the (n−1)th plate carrier bar is energized to move the latter in downward direction.

Of course, electromagnets of similar function could be arranged differently. For instance the springs 102 could serve as armatures if a corresponding electromagnet is mounted close to the respective spring. It is also possible to provide only for one single lifting magnet and one single lowering magnet which may be caused by correspondingly controlled selector means to cooperate with two selected neighboring springs.

It can be seen from FIG. 6 that means may be provided for limiting the upward and downward movement of the plate element carrier bars. For this purpose two brackets 105 may be attached to the lateral ends of the frame 101 and an upper stop bar 104 and a lower stop bar 104' may be supported by the brackets 105 so as to extend horizontally along the upper ends of the bars 110-119. The individual entraining members 130-139 may in this case be provided with rearward extensions e.g. 139' which project into the space between the stop bars 104 and 104'. It is easy to understand that the upward movement will be limited by the extension e.g. 139' of a plate carrier bar abutting against the stop bar 104 while the downward movement will be limited by a similar abutment against the lower stop bar 104'.

It has been stated further above that it is advisable to arrange matters so that for displaying a unit of information different from the one which is displayed when the entire arrangement is in normal position of rest at least one of the plate carrier bars and therefore the corresponding series of plate elements is moved from normal position a certain step downward while simultaneously at least the neighboring plate element carrier bar associated with the series of plate elements behind the downwardly moved one is to be moved a similar step in upward direction. This has been provided for because in this manner the length of the vertical movement of the movable elements of the display board is comparatively small. However, it should be understood that the invention would be also useful and effective if in such a case either the first mentioned carrier bar or the second mentioned carrier bar is moved a larger step upward or downward as the case may be. However, since in this case the length of the movement is comparatively great the advantage of the invention over the prior art is considerably reduced.

It should be noted furthermore that only by way of example an arrangement has been described in which the plate elements extend substantially horizontally and the movements described above occur in vertical direction. Of course, this is not an absolute condition because the display board could be used as well in any other orientation e.g. in such a position that the plate elements extend in vertical direction and the movements occur in a substantially horizontal direction.

Preferably the plate elements are made of thin but stiff or suitably stiffened sheet metal, but other materials as for instance synthetic sheet material may be used also where conditions permit or special conditions have to be met.

It will be understood that each of the elements described above, or two or more together, may also find a useful application in other types of a variable display board differing from the types described above.

While the invention has been illustrated and described as embodied in a variable display board comprising a plurality of series of parallel plate elements, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A variable display board for selectively displaying different units of information, comprising, in combination, frame means having a principal plane and a front side and a rear side relative thereto; information storing means movably mounted in said frame and including for each unit of information to be stored a series of a predetermined number of elongated display plate elements extending parallel with each other and substantially parallel with said plane and partly overlapping one another, respectively, in transverse direction, the forwardly facing exposed parallel surface portions of said series of plate elements being adapted to carry respectively consecutive parallel strip elements of such unit of information so that the composite entire forwardly facing exposed surface area of said series of plate elements carries a complete unit of information, a plurality of such series of plate elements being arranged in said frame relative to each other in such a manner that of all said series of plate elements those elements which have the same sequential order position within the respective series are in normal position superimposed over each other so as to form a stack whereby only said forwardly exposed surface portions of the foremost series of plate elements in said stack and a unit of information carried thereon is visible, said different series of plate elements being shiftable from said normal position thereof to a transversely displaced position in which only the forwardly exposed surface portions of one selected one of said series of plate elements and a unit of information carried thereon is visible; and actuating means in said frame for shifting at least any selected one of said series of plate elements and all the series of plate elements located behind said selected one from said normal position thereof to said transversely displaced position.

2. A variable display board for selectively displaying different units of information, comprising, in combination, frame means having a principal plane and a front side and a rear side relative thereto; information storing means movably mounted in said frame and including for each unit of information to be stored a series of a predetermined number of elongated display plate elements extending parallel with each other and substantially parallel with said plane and partly overlapping one another, respectively, in transverse direction, the forwardly facing exposed parallel surface portions of said series of plate elements being adapted to carry respectively consecutive parallel strip elements of such unit of information so that the composite entire forwardly facing exposed surface area of said series of plate elements carries a complete unit of information, a plurality of such series of plate elements being arranged in said frame relative to each other in such a manner that of all said series of plate elements those elements which have the same sequential order position within the respective series are in normal position superimposed over each other so as to form a stack whereby only said forwardly exposed surface portions of the foremost series of plate elements in said stack and a unit of information carried thereon is visible, said different series of plate elements being shiftable from said normal position thereof to a transversely displaced position in which only the forwardly exposed surface portions of one selected one of said series of plate elements and a unit of information carried thereon is visible; and actuating means in said frame for shifting at least any selected one of said series of plate elements from said normal position thereof to said transversely displaced position in one direction and for shifting simultaneously in opposite direction all the series of plate elements located in front of said one selected series of plate elements.

3. A variable display board for selectively displaying different units of information, comprising, in combination, frame means having a principal plane and a front side and a rear side relative thereto; information storing means movably mounted in said frame and including for each unit of information to be stored a series of a predetermined number of elongated display plate elements extending parallel with each other and substantially parallel with said plane and partly overlapping one another, respectively, in transverse direction, the forwardly facing exposed parallel surface portions of said series of plate elements being adapted to carry respectively consecutive parallel strip elements of such unit of information so that the composite entire forwardly facing exposed surface area of said series of plate elements carries a complete unit of information, a plurality of such series of plate elements being arranged in said frame relative to each other in such a manner that of all said series of plate elements those elements which have the same sequential order position within the respective series are in normal position superimposed over each other so as to form a stack whereby only said forwardly exposed surface portions of the foremost series of plate elements in said stack and a unit of information carried thereon is visible, said different series of plate elements being shiftable from said normal position thereof to a transversely displaced position in which only the forwardly exposed surface portions of one selected one of said series of plate elements and a unit of information carried thereon is visible; and actuating means in said frame for shifting any selected one of said series of plate elements and all the series of plate elements located behind said selected one from said normal position thereof to said transversely displaced position in one direction and for shifting simultaneously in opposite direction all the series of plate elements located in front of said one selected series of plate elements.

4. A variable display board for selectively displaying different units of information, comprising, in combination, frame means having a principal plane and a front side and a rear side relative thereto; information storing means movably mounted in said frame and including for each unit of information to be stored a series of a predetermined number of elongated display plate elements extending parallel with each other and substantially parallel with said plane and partly overlapping one another, respectively, in transverse direction, the forwardly facing exposed parallel surface portions of said series of plate elements being adapted to carry respectively consecutive parallel strip elements of such unit of information so that the composite entire forwardly facing exposed surface area of said series of plate elements carries a complete unit of information, a plurality of such series of plate elements being arranged in said frame relative to each other in such a manner that of all said series of plate elements those elements which have the same sequential order position within the respective series are in normal position superimposed over each other so as to form a stack whereby only said forwardly exposed surface portions of the foremost series of plate elements in said stack and a unit of information carried thereon is visible, said different series of plate elements being shiftable from said normal position thereof to a transversely displaced position in which only the forwardly exposed surface portions of one selected one of said series of plate elements and a unit of information carried thereon is visible, and a plurality of plate elements carriers each connected with a different one of said series of plate elements, respectively, for supporting the latter, said plate element carriers being arranged in a row one next to the other behind said plurality of series of plate elements and movable relative to said frame in said transverse direction; and actuating means in said frame for shifting at least any selected one of said plate element carriers and thus the respectively connected selected series of plate elements from said normal position thereof to said transversely displaced position in one direction and for shifting simultaneously in opposite direction the plate element carriers respectively connected with all the series of plate elements located in front of said one selected series of plate elements.

5. A variable display board for selectively displaying different units of information, comprising, in combination, frame means having a principal plane and a front side and a rear side relative thereto; information storing means movably mounted in said frame and including for each unit of information to be stored a series of a predetermined number of elongated display plate elements extending parallel with each other and substantially parallel with said plane and partly overlapping one another, respectively, in transverse direction, the forwardly facing exposed parallel surface portions of said series of plate elements being adapted to carry respectively consecutive parallel strip elements of such unit of information so that the composite entire forwardly facing exposed surface area of said series of plate elements carries a complete unit of information, a plurality of such series of plate elements being arranged in said frame relative to each other in such a manner that of all said series of plate elements those elements which have the same sequential order position within the respective series are in normal position superimposed over each other so as to form a stack whereby only said forwardly exposed surface portions of the foremost series of plate elements in said stack and a unit of information carried thereon is visible, said different series of plate elements being shiftable from said normal position thereof to a transversely displaced position in which only the forwardly exposed surface portions of one selected one of said series of plate elements and a unit of information carried thereon is visible, and a plurality of plate element carriers each connected with a different one of said series of plate elements, respectively, for supporting the latter, said plate element carriers being arranged in a row one next to the other behind said plurality of series of plate elements and movable relative to said frame in said transverse direction; and actuating means in said frame for shifting any selected one of said plate element carriers and thus the respectively connected selected series of plate elements and all the plate element carriers respectively connected with the series of plate elements located behind said selected one from said normal position thereof to said transversely displaced position in one direction and for shifting simultaneously in opposite direction the plate element carriers respectively connected with all the series of plate elements located in front of said one selected series of plate elements.

6. A variable display board as claimed in claim 4, wherein said plate element carriers include entraining means for transmitting motion applied to any one thereof in said opposite direction also to said plate element carriers associated with all said series of plate elements located in front of said one selected series thereof.

7. A variable display board as claimed in claim 5, wherein said plate element carriers include entraining means for transmitting motion applied to any one thereof in said one direction to all the plate element carriers connected with series of plate elements located behind said selected one series thereof, and for transmitting motion applied to any one of said plate element carriers in said opposite direction to all the plate element carriers connected with series of plate elements located in front of said selected one series thereof.

8. A variable display board as claimed in claim 6, wherein said entraining means include a plurality of lugs fixed to an end portion of said different plate element carriers, respectively, each lug projecting into the path of the respectively neighboring plate element carrier so as to abut against the latter when either one of said neighboring carriers is moved in a predetermined direction.

9. A variable display board as claimed in claim 7, wherein said entraining means include a plurality of lugs fixed to an end portion of said different plate element carriers, respectively, each lug projecting into the path of the respectively neighboring plate element carrier so as to abut against the latter when either one of said neighboring carriers is moved in a predetermined direction.

10. A variable display board as claimed in claim 2, wherein said plate elements are constructed each as a strip of thin stiff sheet metal including a transverse extension connected to the respectively pertaining plate element carrier.

11. A variable display board as claimed in claim 2, wherein said actuating means include electromagnet means energization of which has the effect that by magnetic attraction a portion of said information storing means is shifted from its normal position to a displaced position.

12. A variable display board as claimed in claim 4, wherein said actuating means include a plurality of electromagnet means stationarily mounted in said frame, each of said electromagnet means being individually energizable and each cooperating with a different one of said plate element carriers so as to shift, when energized, the latter from its normal position to a displaced position.

13. A variable display board as claimed in claim 4, wherein said actuating means include a plurality of electromagnet means stationarily mounted in said frame, each of said electromagnet means being individually energizable and each cooperating with a different one of said plate element carriers so as to shift, when energized, the latter from its normal position to a displaced position.

14. A variable display board as claimed in claim 5, wherein said actuating means include a plurality of electromagnet means stationarily mounted in said frame, each of said electromagnet means being individually energizable and each cooperating with a different one of said plate element carriers so as to shift, when energized, the latter from its normal position to a displaced position.

References Cited by the Examiner
UNITED STATES PATENTS

| | | | |
|---|---|---|---|
| 2,141,398 | 12/1938 | Lownestein | 40—65 |
| 2,163,188 | 6/1939 | Bosche | 40—28 |
| 2,829,456 | 4/1958 | Hutterer | 40—65 |
| 3,080,668 | 3/1963 | Reali | 40—65 X |

JEROME SCHNALL, *Primary Examiner.*

EUGENE R. CAPOZIO, *Examiner.*

W. GRIEB, *Assistant Examiner.*